United States Patent [19]
Collier et al.

[11] Patent Number: 5,404,405
[45] Date of Patent: Apr. 4, 1995

[54] FM STEREO DECODER AND METHOD USING DIGITAL SIGNAL PROCESSING

[75] Inventors: Kevin T. Collier, Gardena; Kevin T. Chan, Pasadena, both of Calif.

[73] Assignee: Hughes Aircraft Company, Los Angeles, Calif.

[21] Appl. No.: 105,323

[22] Filed: Aug. 5, 1993

[51] Int. Cl.$^6$ ............................................. H04H 5/00
[52] U.S. Cl. ..................................... 381/7; 375/259; 375/340; 331/20; 331/25
[58] Field of Search ................. 381/4, 7; 331/25, 20; 329/317, 320, 323, 325, 361; 375/97, 39; 370/70, 121, 20

[56] References Cited

U.S. PATENT DOCUMENTS

| | | | |
|---|---|---|---|
| 4,652,838 | 3/1987 | Nossen | 380/6 |
| 5,249,203 | 9/1993 | Loper | 375/98 |

OTHER PUBLICATIONS

Krauss et al., Solid State Radio Engineering, John Wiley & Sons, 1980, pp. 318–322.
Manlove, "A Fuly Integrated High Performance FM Stereo Decoder", IEEE 1991 Custom Integrated Circuits Conf., pp. 24.6.1–24.6.3.
Haug et al., "A DSP–Based Stereo Decoder for Automotive Radio", SAE Technical Paper Series, 1990, No. 900244.

Primary Examiner—Forester W. Isen
Attorney, Agent, or Firm—Georgann S. Grunebach; Terje Gudmestad; W. K. Denson-Low

[57] ABSTRACT

A digital FM stereo decoder uses the phase characteristics of linear phase FIR filters, together with a trignometric operation, to generate a 38 kHz subcarrier signal from a 19 kHz pilot. The subcarrier signal is mixed with the input composite signal from which the pilot has been removed to shift its $L-R$ component to baseband; the linear phase FIR filters also maintain phase coherence between the subcarrier and the composite signals. A low distortion output is obtained without the use of a phase locked loop for the regeneration of the subcarrier signal.

26 Claims, 1 Drawing Sheet

FM STEREO DECODER AND METHOD USING DIGITAL SIGNAL PROCESSING

BACKGROUND OF THE INVENTION

1. Field of the Invention

This invention relates to FM stereo decoding, and more particularly to stereo decoding using digital signal processing (DSP).

2. Description of the Related Art

It would be desirable to obtain the potentially distortion-free benefits offered by DSP for FM stereo decoding. As in other areas, the use of digital processing creates the potential for greater fidelity in FM audio products. Likely applications for digital processing in stereo receivers includes home audio, automotive audio and stereo television.

The standard FM stereo broadcast signal in the United States consists of an L+R (left+right) signal within the baseband frequency range of 50-15,000 Hz, an L−R signal that has been translated in frequency onto a subcarrier of 38 kHz (the subcarrier is then supressed), and a 19 kHz pilot signal that is used in the restoration of the L and R signals after demodulation of the composite signal in the receiver.

Upon reception, the received signal is demodulated to recover the composite modulating signal. The composite signal is processed through a bandpass filter that passes only frequencies in the range of 23-53 kHz, thereby extracting the L−R double-sideband signal. The 19 kHz pilot signal is also extracted with a filter, and is then passed through a frequency doubler-amplifier circuit from which a signal of 38 kHz is obtained. This signal and the output of the bandpass filter are mixed together, yielding an L−R audio signal at the 50-15,000 Hz baseband. Finally, the L+R and L−R signals are fed to a circuit which separates them into the L and R signals, in a manner inverse to that in which they were generated at the transmitter. After further amplification, the L and R signals are furnished to an appropriate stereophonic loudspeaker system.

Non-linear analog circuits are used to accomplish the frequency doubling from 19 to 38 kHz in the receiver. Unfortunately, this adds an undesirable level of distortion. In an alternate approach, a 38 kHz signal is generated at the receiver and locked to the 19 kHz pilot signal with a phase locked loop (PLL). Such systems have been implemented with both analog circuits (Krauss et al., *Solid State Radio Engineering*, John Wiley & Sons, 1980, pages 318-322), and with digital technology (Manlove, "A Fully Integrated High Performance FM Stereo Decoder", *IEEE 1991 Custom Integrated Circuits Conf.*, pages 24.6.1-24.6.3). A combined analog/-digital circuit with a PLL is described in Haug et al., "A DSP-Based Stereo Decoder for Automotive Radio" *SAE Technical Paper Series*, 1990, No. 900244. However, the use of a PLL introduces distortion, and also involves the use of a tracking loop that adds to the circuitry requirements.

SUMMARY OF THE INVENTION

The present invention seeks to provide an improved FM stereo decoder that generates a 38 kHz signal with a very low level of distortion, for mixing with the L−R signal and that enables exact tracking of the 19 kHz pilot signal without the use of a tracking loop.

These goals are achieved with a digital system that uses a novel technique to regenerate the 38 kHz subcarrier from the 19 kHz pilot signal, and to maintain exact phase coherence between these signals. After demodulation and conversion to digital format, a digital bandpass filter is used to extract the pilot signal from the incoming composite signal; a first digital delay filter keeps the composite signal in phase with the extracted pilot signal. A plurality of digital filters operate upon the extracted pilot signal to obtain a pair of 19 kHz signals that are in mutual phase quadrature. A subcarrier frequency generator then operates upon these phase quadrature signals, using a mathematical function to obtain a 38 kHz mixing signal. Meanwhile, a second delay filter delays the pilot-free composite signal to keep it in phase with the mixing signal. The two signals are mixed to shift the L−R signal to baseband, allowing the L and R signals to be extracted from the L+R and L−R signals that are now both within the common baseband range.

In the preferred embodiment, the digital filters are linear phase finite impulse response (FIR) filters. The linear phase FIR filter used to obtain the 19 kHz phase quadrature signal performs a Hilbert transform on the extracted pilot signal. The Hilbert transform filter has length N, where (N−1)/2 is an integer. The other linear phase FIR filter which operates on the extracted pilot signal is implemented as a (N−1)/2 sample delay. The composite signal is also delayed (N−1)/2 samples to track the phase quadrature signals at the pilot frequency.

The phase quadrature signals are operated upon to produce a 38 kHz signal having the form $(I^2+Q^2)$ where I and Q represent the respective mutual phase quadrature signals. This 38 kHz signal is divided by $(I^2+Q^2)$ to obtain a normalized mixing signal at the 38 kHz subcarrier frequency, without the use of a tracking loop.

The invention can be implemented in either hardware or software, and generates a 38 kHz mixing signal with a very low level of distortion. Exact phase coherence is achieved through the phase response characteristics of the linear phase FIR filters. Further features and advantages of the invention will be apparent to those skilled in the art from the following detailed description, taken together with the accompanying drawing.

DETAILED DESCRIPTION OF THE INVENTION

Figure 1:
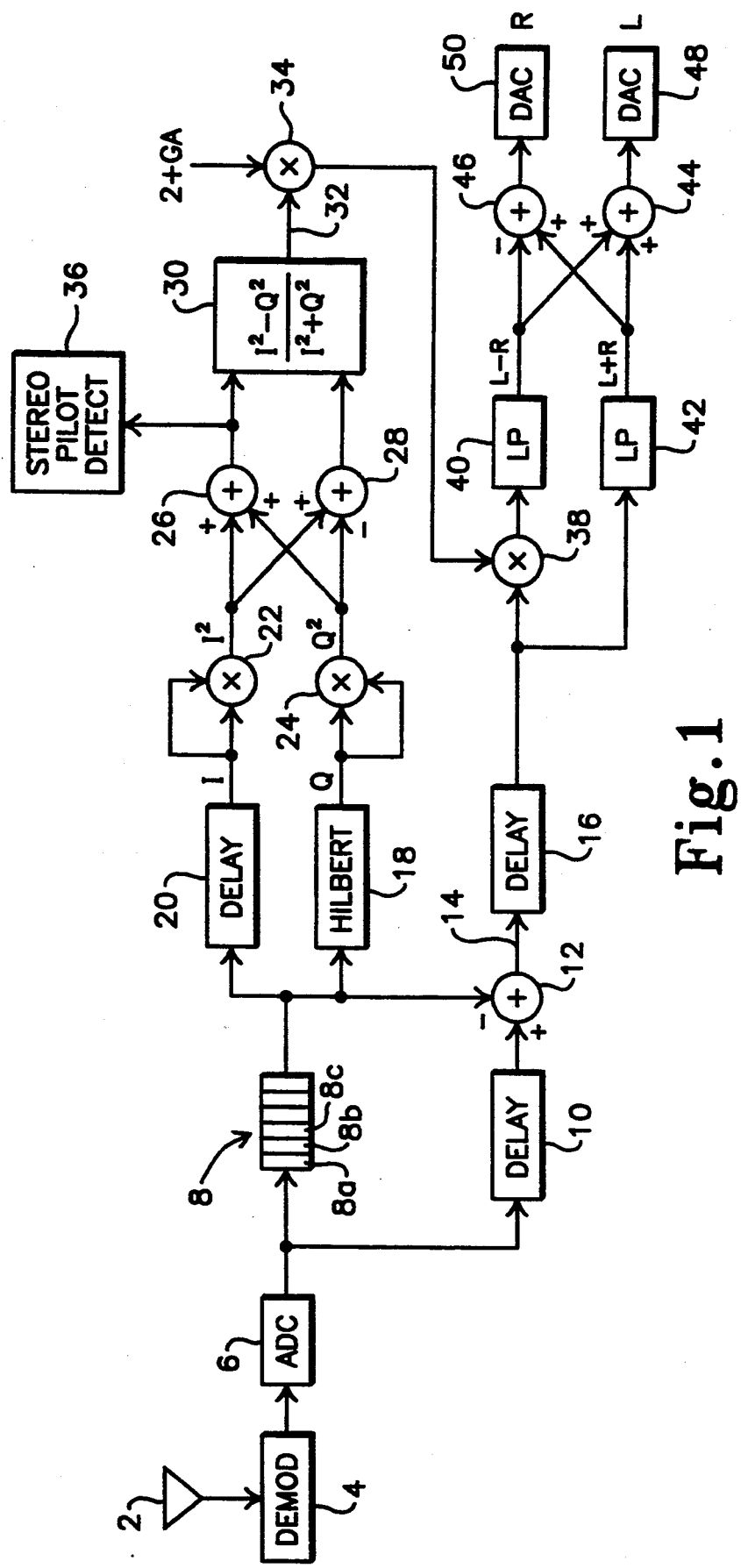
FIG. 1 is a block diagram of a DSP system that can be used to implement the invention.

A block diagram of a preferred implementation for the FM stereo decoder of the present invention is shown in FIG. 1. The broadcast FM signal is received by an antenna 2 and supplied to a demodulator 4, which recovers the composite modulating signal. The composite signal is then converted to digital format by an analog-to-digital converter (ADC) 6. The order of demodulation and digital conversion can be reversed if desired, with the incoming FM signal converted to digital format and the digital FM signal then demodulated.

The 19 kHz pilot signal is extracted by processing the signal through M digital filters 8, where M is at least 1. The combined response of filters 8 is a 19 kHz bandpass filter. The individual filters 8a, 8b, 8c, etc. are preferably implemented as linear phase FIR filters to assist in maintenance of phase coherence in the decoding process.

With a linear phase filter, the filter's delay is linearly related to its length. The filters may be a combination of low pass filters, high pass filters and bandpass filters such that the aggregate response is a 19 kHz bandpass filter.

Since a linear phase FIR filter of length L has a phase shift corresponding to a delay of $(L-1)/2$ samples, the aggregate signal delay associated with the FIR filters 8 is:

$$\sum_{i=1}^{M} \frac{L(i) - 1}{2},$$

where $L(i)$ is the length of the filter i, and $i=1,2,3,\ldots M$. The composite signal at the output of ADC 6 is subjected to a delay equal to that of the extracted pilot signal by processing it through another linear phase FIR filter 10, which again can be implemented as a plurality of separate FIR filters.

The 19 kHz bandpass FIR filter coefficients are selected so that the L+R and L−R frequency components are rejected, and such that the filters have maximum gain at 19 kHz. The preferred implementation would have unity gain at 19 kHz. The composite signal filter coefficients are selected so that the filters have a flat passband response for the L+R and L−R signals with a passband gain equal to the 19 kHz passband filter gain, and a gain less than or equal to the passband gain in other frequency regions. If the aggregate delay of the FIR filters 8 is an integer, the composite signal FIR filter 10 may be implemented as a simple delay with a delay equal to the aggregate delay of filters 8.

Delaying the composite signal by the same amount as the extracted pilot signal ensures that it remains in phase with the pilot signal, thus eliminating the need for a tracking loop to accomplish this function. The number of individual FIR filters selected for the pilot signal extraction filter 8 is a matter of design choice; the extracted pilot signal will generally be cleaner and have a greater signal:noise ratio as the number of individual filters is increased, and as the lengths of the individual filters are increased. Selecting a combination of filter lengths and number of filters such that the aggregate delay of filters 8 is an integer enables filter 10 to be implemented as a delay.

The filtered 19 kHz pilot signal is subtracted from the composite signal in a subtraction node 12, producing a pilot-free composite signal at the node output 14. This signal is delayed by another FIR filter 16 to maintain its phase coherence with a regenerated 38 kHz subcarrier signal, the production of which will now be described.

The extracted pilot signal is also processed through first and second linear phase FIR delay filters 18 and 20. Filter 20 has the same length as the delay filter 16 for the pilot-free composite signal. Filter 18 preferably performs a Hilbert transform upon the extracted pilot signal, and has a sample length N. For a narrow band signal such as the pilot, the Hilbert transform introduces a 90° phase shift in addition to the phase delay that is related to its length. As known in the art, the Hilbert transform can be implemented in either hardware or software. The selection of the value of N involves a tradeoff between performance and costs; a larger N yields a greater separation between the ultimate L and R signals, but it is more expensive to implement. A value of N on the order of 15 is generally a good compromise for home stereo applications.

The linear phase FIR filter 20 has length N to preserve a 90° degree phase difference between the outputs of filters 18 and 20. Thus, the output of filter 18 (designated Q) and the output of filter 20 (designated I) are in mutual phase quadrature. The linear phase FIR filter 16 also has length N. Thus, phase coherence is maintained between the outputs of filters 16, 18 and 20. If $(N-1)/2$ is an integer, filters 16 and 20 may be implemented as $(N-1)/2$ sample delays. Otherwise, the FIR filter coefficients for filter 20 are selected so that the filter has unity gain at 19 kHz, and less than unity gain elsewhere, and the coefficients for filter 16 are selected to meet the same gain specification as for filter 10.

The I and Q signals are now subjected to a trigonometric transformation to generate a new signal at the 38 kHz subcarrier frequency. First, the signals are self-multiplied in multipliers 22 and 24 to obtain I2 and Q2 outputs, respectively. They are then cross-added and cross-subtracted in summing and subtracting nodes 26 and 28, respectively, to produce inputs to a divider 30 in the form $(I^2-Q^2)$ and $(I^2+Q^2)$. The $(I^2-Q^2)$ signal is at the 38 kHz subpilot frequency. This results from the well known trigonometric relationship:

$$\cos^2 \omega - \sin^2 \omega = \cos 2\omega.$$

The $(I^2+Q^2)$ expression equals the square of the amplitude of the 38 kHz subpilot. With prior systems, either the subcarrier or the pilot signal would be clipped to achieve unity amplification when the subcarrier signal is multiplied by the pilot-free composite signal to extract the L−R signal. However, this clipping produces distortion in the final L and R signals. In accordance with the invention, the subcarrier signal $(I^2-Q^2)$ is normalized with the value $(I^2+Q^2)$ to achieve unity amplification, without having to clip either signal. This is the function of divider 30, which divides the subcarrier signal power by the pilot signal power.

The normalized 38 kHz subcarrier signal at the output 32 of divider 30 is then multiplied by 2 in a multiplier 34. This is a conventional step, since mixing the 38 kHz signal with the L−R component of the composite signal shifts half of the output power to baseband, and half to 76 kHz. The baseband L−R signal is doubled to bring it up to parity with the L+R baseband component of the composite signal. The multiplication by 2 can be modified if desired by a gain adjust (GA) factor in case the various filters do not have flat responses, or exhibit other than unity amplification. The GA factor can be selected by trial and error, or perhaps in certain cases by precalculation, to improve the L/R separation. Another conventional step is a stereo pilot detection function 36, which tests whether the pilot signal is strong enough to perform the downstream stereo decoding.

The adjusted 38 kHz subcarrier signal from multiplier 34 is mixed with the delayed pilot-free composite signal from delay filter 16 in a multiplier 38 to generate the L−R baseband signal. The L−R signal from multiplier 38, and the L+R signal from the delay filter 16, are filtered by respective lowpass filters 40 and 42 to remove frequency components that are outside of the baseband. The L channel signal is obtained by adding the L+R and L−R baseband signals in summing node 44, while the R channel signal is obtained by subtracting the L−R signal from the L+R signal in a subtraction node 46. The L and R signals are then typically converted back to analog format by respective digital-toanalog converters (DACs) 48 and 50 and amplified as necessary to drive a set of stereo speakers.

The described DSP FM stereo decoder produces very low distortion L and R output signals, with a high degree of channel separation. The various DSP functions can be implemented either in hardware, or on a microprocessor that is programmed to implement the functions in software. For example, the various delay functions can be performed either with hardware shift registers, or with software FIR filters. In this context, the use of either hardware to implement a linear phase FIR filter function is equivalent to the use of software to implement the same type of function.

While particular embodiments of the invention have been described, numerous variations and alternate embodiments will occur to those skilled in the art. Accordingly, it is intended that the invention be limited only in terms of the appended claims.

We claim:

1. An FM stereo decoder using digital signal processing, comprising:
   a demodulator and analog-to-digital converter (ADC) for demodulating and converting an FM signal having an L+R (left+right) baseband signal, an L−R signal centered on a subcarrier frequency, and a pilot signal at less than the subcarrier frequency, to a digital demodulated composite signal,
   an analog-to-digital converter (ADC) for converting the FM signal to digital format, said demodulator and ADC together yielding a digital demodulated composite signal,
   a digital bandpass filter for extracting the pilot signal from said composite signal,
   a first digital delay filter for maintaining said composite signal in phase with the extracted pilot signal,
   a differencing node for removing the pilot signal from said composite signal by taking the difference between said composite signal and the in-phase extracted pilot signal, thereby yielding a pilot-free composite signal,
   a plurality of digital filters operating upon said extracted pilot signal to obtain a pair of filtered signals at the pilot signal frequency and in mutual phase quadrature relationship,
   a subcarrier frequency generator operating upon said mutual phase quadrature signals to obtain a mixing signal at the subcarrier frequency,
   a second digital delay filter for delaying said pilot-free composite signal to keep it in-phase with said mixing signal,
   a mixer for mixing said delayed pilot-free composite signal with said mixing signal to shift said L−R signal to a baseband frequency range, and
   an output processor for extracting said L and R signals from said delayed pilot-free composite signal and said baseband L−R signal.

2. The FM stereo decoder of claim 1, said plurality of digital filters comprising a pair of filters having phase delay differences that differ from each other by 90°.

3. The FM stereo decoder of claim 2, said pair of filters comprising first and second linear phase finite impulse response (FIR) delay filters having a length N.

4. The FM stereo decoder of claim 3, wherein said digital filters have a length N, where (N−1)/2 is an integer.

5. The FM stereo decoder of claim 3, said first linear phase FIR delay filter performing a Hilbert transform upon said extracted pilot signal.

6. The FM stereo decoder of claim 5, wherein said digital filters have a length N, where (N−1)/2 is an integer.

7. The FM stereo decoder of claim 5, wherein said second digital delay filter comprises a linear phase FIR filter that also has a delay of (N−1)/2 samples.

8. The FM stereo decoder of claim 1, said digital bandpass filter comprising a plurality of linear phase FIR filters having respective sample lengths L, where $$\sum_{i=1}^{M} \frac{L(i) - 1}{2}$$

is an integer, and M is the number of linear phase FIR filters.

9. The FM stereo decoder of claim 1, said subcarrier frequency generator operating upon said pair of mutual phase quadrature signals at the pilot signal frequency to produce a signal at the subcarrier frequency in the form $I^2 - Q^2$, where I and Q are the respective mutual phase quadrature signals.

10. The FM stereo decoder of claim 9, said subcarrier frequency generator dividing said $I^2 - Q^2$ signal by $I^2 + Q^2$ to obtain a normalized signal at the subcarrier frequency.

11. The FM stereo decoder of claim 10, said subcarrier frequency generator further multiplying said $$\frac{I^2 - Q^2}{I^2 + Q^2}$$

signal by 2 prior to mixing with said delayed pilot-free composite signal.

12. The FM stereo decoder of claim 1, wherein said decoder is implemented in hardware.

13. The FM stereo decoder of claim 1, said decoder comprising a microprocessor programmed to implement said decoder functions in software.

14. A digital signal processor (DSP) for doubling the frequency of the pilot signal component of an input composite digital signal that has pilot and information signal components, the pilot signal having a given frequency $\omega$, comprising:
   a digital bandpass filter arranged to extract said pilot signal component from said composite input signal,
   a plurality of digital filters operating upon said extracted pilot signal component to obtain a pair of filtered signals Q and I at the pilot signal frequency, where Q and I are in mutual phase quadrature at the frequency $\omega$, and
   a frequency doubler operating upon said Q and I signals to obtain an input signal at the frequency $2\omega$.

15. A digital signal processor (DSP) for doubling the frequency of an input digital signal having a given frequency $\omega$, comprising:
   a plurality of digital filters operating upon said input signal to obtain a pair of filtered signals Q and I, where Q and I are in mutual phase quadrature at the frequency $\omega$, said plurality of digital filters comprising a pair of filters having phase delays that differ from each other by 90°, and a frequency doubler operating upon said Q and I signals to obtain an output signal at the frequency $2\omega$.

16. The DSP of claim 15, said pair of filters comprising first and second linear phase finite impulse response (FIR) delay filters having a length N.

17. The DSP of claim 16, said first FIR delay filter performing a Hilbert transform upon said input signal.

18. The DSP of claim 17, wherein $(N-1)/2$ is an integer, and said second FIR delay filter comprises a $(N-1)/2$ sample delay.

19. The DSP of claim 14, said frequency doubler operating directly upon said Q and I signals to produce a signal with a frequency $2\omega$ in the form $I^2-Q^2$.

20. The DSP of claim 19, said frequency doubler dividing said $I^2-Q^2$ signal by $I^2+Q^2$ to obtain a normalized $2\omega$ frequency signal.

21. The DSP of claim 19, said plurality of digital filters comprising first and second linear phase finite impulse response (FIR) delay filters having a length N, where $(N-1)/2$ is an integer.

22. The DSP of claim 14, wherein said DSP is implemented in hardware.

23. The DSP of claim 14, comprising a microprocessor programmed to implement said digital filters and frequency doubler in software.

24. A method of obtaining a mixing signal for mixing with a composite FM stereo signal, said composite signal having a pilot signal component at a frequency $\omega$, an L+R (left+right) baseband signal, and an L−R signal centered on a subcarrier frequency $2\omega$ comprising:

extracting said pilot signal component from said composite signal, generating a pair of signals Q and I from said extracted pilot signal component at the pilot signal frequency $\omega$ in mutual phase quadrature, squaring said Q and I signals to obtain signals in the form $Q^2$ and $I^2$, and subtracting the $Q^2$ signal from the $I^2$ signal to obtain a signal in the form $I^2-Q^2$ at the frequency $2\omega$.

25. The method of claim 24, wherein said Q and I signals are digital signals and are generated by processing said extracted pilot signal component at the frequency $\omega$ through a pair of linear phase finite impulse response (FIR) delay filters having lengths N, where $(N-1)/2$ is an integer.

26. The method of claim 24, further comprising the step of adding said $I^2$ and $Q^2$ signals to obtain a signal in the form $I^2+Q^2$, and normalizing said $I^2-Q^2$ signal by dividing it by said $I^2+Q^2$ signal.

* * * * *